US005261321A

United States Patent [19]

Whitacre

[11] Patent Number: 5,261,321

[45] Date of Patent: Nov. 16, 1993

[54] PISTON HAVING OVAL SHAPED CROWN

[75] Inventor: John P. Whitacre, New Haven, Ind.

[73] Assignee: Zollner Corporation, Fort Wayne, Ind.

[21] Appl. No.: 847,360

[22] Filed: Mar. 6, 1992

[51] Int. Cl.[5] .......... F16V 1/00

[52] U.S. Cl. .......... 92/177; 92/233

[58] Field of Search .......... 92/277, 233; 123/193.6

[56] References Cited

U.S. PATENT DOCUMENTS

| | | | |
|---|---|---|---|
| 1,275,064 | 8/1918 | Mason et al. | 92/233 |
| 1,514,022 | 11/1924 | Smith . | |
| 2,262,132 | 11/1941 | Berry . | |
| 2,309,555 | 1/1943 | Venner et al. . | |
| 2,513,814 | 7/1950 | Moore . | |
| 4,362,135 | 12/1982 | Irimajiri | 123/193.6 |
| 4,470,375 | 9/1984 | Showalter . | |
| 4,648,309 | 3/1987 | Schellmann . | |
| 4,831,919 | 5/1989 | Bruni . | |

FOREIGN PATENT DOCUMENTS

| | | | |
|---|---|---|---|
| 869756 | 2/1942 | France . | |
| 60641 | 7/1980 | Japan | 92/177 |
| 0104951 | 4/1989 | Japan . | |

*Primary Examiner*—Edward K. Look
*Assistant Examiner*—F. Daniel Lopez
*Attorney, Agent, or Firm*—Barnes & Thornburg

[57] ABSTRACT

A piston for connection by a piston pin and connecting rod to a crankshaft for reciprocating in a cylinder of an internal combustion engine. The piston has a crown and top land region, an intermediate region including at least one additional land, and a skirt region. Cross sections through the crown and top land region transverse to the cylinder axis are ovals whose major axes are generally parallel to the longitudinal axis of the piston pin. Cross sections through the intermediate region are either circular or oval, major axes of each of the ovals being generally transverse to the longitudinal axis of the piston pin.

13 Claims, 2 Drawing Sheets

PISTON HAVING OVAL SHAPED CROWN

BACKGROUND AND SUMMARY OF THE INVENTION

This invention relates to a novel configuration for a piston for a four-stroke cycle internal combustion engine.

Pistons having oval cross sections transverse to the axes of the cylinders in which they reciprocate along at least a part of their lengths are known. Conventionally, the major axis of the ellipse in the thrust and counter-thrust face region of the skirt extends transverse to the axis of the wrist pin. There are, for example, the pistons illustrated and described in U.S. Pat. Nos.: 1,514,022; 2,262,132; 2,309,555; 2,513,814; 4,470,375; and, 4,648,309.

Published Japanese Patent Specification 1-104,951 discloses a piston having elliptical cross sections transverse to the piston and cylinder axes in the crown and ring band region. The major axes of these ellipses extend in the same direction as the axis of the wrist pin.

French Patent Specification 869,756 shows uniformly progressive ovality of a piston. The piston has cross-sectional ovality at the bottom of its skirt transverse to the piston pin axis, a progressive transition through a circular cross section in the plane of the piston pin axis transverse to the cylinder axis, and a continuing uniform transition to ovality in the opposite sense (that is, with the major axis of the oval parallel to the piston pin axis) at the crown of the piston. This runs counter to modern piston design, wherein the designer strives to optimize the competing considerations of heat transfer between the crown and cylinder wall on the one hand and clearance for reduced frictional loss on the other hand.

Applicant makes no representation by this discussion, nor should any such representation be inferred, that an exhaustive search of all relevant prior art has been conducted, or that no more pertinent prior art exists.

It is an object of the present invention to provide a piston design which reduces the so-called "dead volume" between the cylinder and the crown and top land region. Reduction of this dead volume enhances fuel efficiency and reduces emissions.

According to the invention, a piston for an internal combustion engine has a crown and top land region, an intermediate region including at least one additional land, and a skirt region. Cross sections through the crown and top land region transverse to the cylinder axis are ovals whose major axes are generally parallel to the axis of the piston pin. Cross sections through the intermediate region are either substantially circular or oval. Their longest dimensions are or equal to the length of the major axes of the ovals of the crown and top land region cross sections.

According to an illustrative embodiment of the invention, cross sections through the crown and top land region are uniform ovals.

Additionally, illustratively according to the invention, the longest dimensions of cross sections through the intermediate region are all substantially the same.

Further illustratively according to the invention, the longest dimensions of the cross sections through the intermediate region are less than the length of the minor axes of the ovals of the crown and top land region cross sections.

The piston further comprises a skirt region. The intermediate region is located between the crown and top land region and the skirt region. According to an illustrative embodiment, cross sections through the skirt region transverse to the cylinder axis are ovals whose major axes are generally perpendicular to the piston pin axes.

Illustratively, the lengths of the major axes of the cross sections through the skirt region increase uniformly from the junction of the skirt region with the intermediate region to about the middle of the length of the skirt region and then decrease from about the middle of the length of the skirt region to the remote end of the skirt region.

The invention may best be understood by referring to the following description and accompanying drawings which illustrate the invention.

DETAILED DESCRIPTION OF THE DRAWINGS

Figure 1:
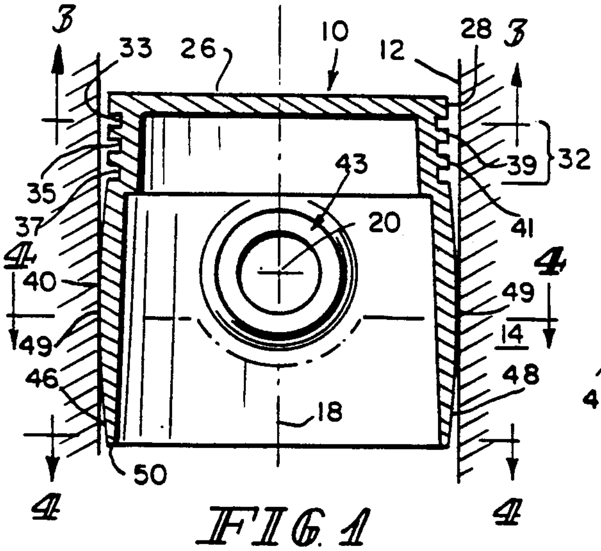
FIG. 1 illustrates a sectional side elevational view of a piston in a cylinder in the plane defined by the cylinder's axis transverse to the axis of the wrist pin.

A piston 10 is illustrated in FIGS. 1-5 in the cylinder 12 of an engine 14. The piston rings have been omitted from the ring grooves for purpose of clarity. FIG. 1 illustrates a section through the piston 10 and cylinder 12. The plane of FIG. 1 is the plane defined by the axis 18 of the cylinder 12, and is transverse to the axis 20 of the wrist pin 22 by which the piston 10 is pivotally connected to a connecting rod 24. The other end of the connecting rod 24, of course, is coupled to the engine 14's crankshaft.

Figure 3:
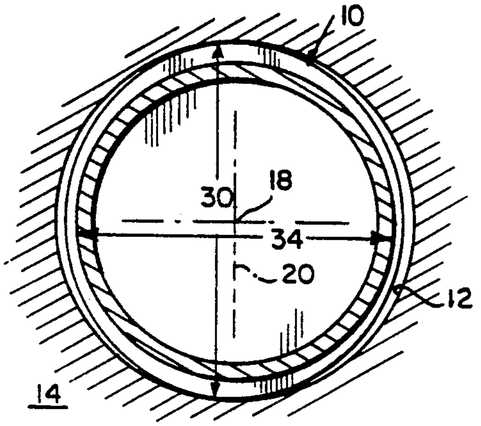
FIG. 3 illustrates a sectional view taken along section lines 3—3 of FIG. 1.
Figure 2:
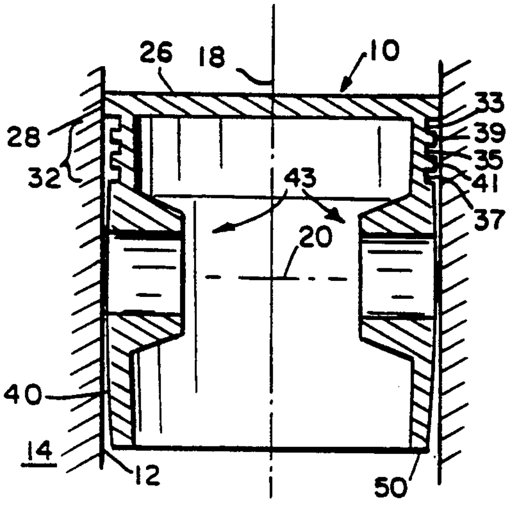
FIG. 2 illustrates a sectional side elevational view of the piston and cylinder of FIG. 1 in the plane defined by the cylinder's axis and the axis of the wrist pin.
Figure 4:
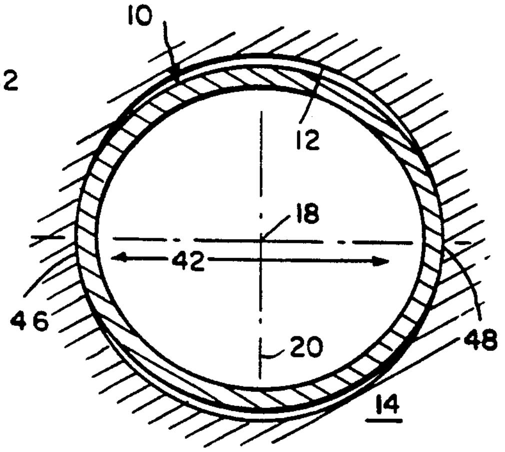
FIG. 4 illustrates a sectional view taken along section lines 4—4 of FIG. 1.
Figure 5:
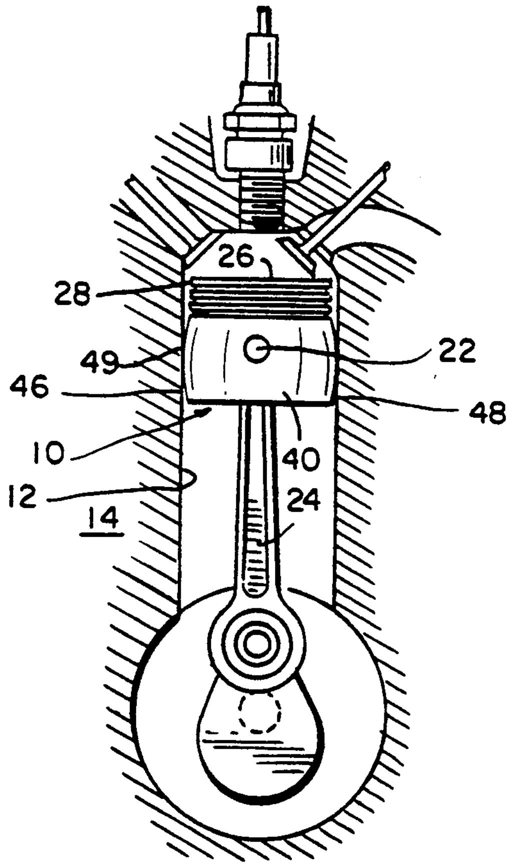
FIG. 5 illustrates a simplified sectional end elevational view of a four stroke cycle, internal combustion engine, through a cylinder of the engine, containing a piston according to the present invention.

The plane of FIG. 2 is the plane defined by the axis 18 of the cylinder 12 and the axis 20 of the wrist pin 22. FIGS. 3-4 illustrate somewhat fragmentarily views of the piston 10 in the cylinder 12 looking in the directions of section arrows 3—3 and 4—4, respectively, in FIG. 1. Although the shape of the piston 10 in FIGS. 1-5 is exaggerated for purposes of illustration, it will be appreciated that in the region of the crown 26 and top land 28 of piston 10, cross sections through the piston 10 transverse to the cylinder 12's axis 18 are ovals, the long dimension, or major axis 30, of each of which extends generally parallel to the axis 20 of the wrist pin 22. These ovals illustratively are symmetrical about the wrist pin axis 20. Illustratively, these ovals are ellipses of uniform external (piston sidewall) dimensions. The purpose of this ovality of constant value (uniform oval cross section piston outer wall) in the top land region 28 is to minimize so-called dead volume between the top land 28's surface and the cylinder 12's wall. This dead volume receives the fuel air charge but does not effectively participate in the combustion "burn." Unburned gases scavenged from this dead volume are exhausted primarily as unburned hydrocarbons. The invention thus lowers unburned hydrocarbon exhaust emissions.

It will further be appreciated that in the intermediate region 32 extending from directly beneath the crown 26 and top land 28 to the bottom ring groove 37, cross sections through piston 10 transverse to the axis 18 of the cylinder 12 can be either circular or oval, depending upon the individual application. If these cross sections are ovals, their major axes will extend generally transverse to the piston pin axis 20. The diameters of these circles or the lengths of the major axes of these ovals, as the case may be, are less than or equal to the lengths of the major axes 30 of cross sections in the crown 26 and top land 28 region. The intermediate region 32 includes the ring grooves 33, 35, 37, and the second and third lands 39, 41, respectively.

It will also be appreciated that in the region of the skirt 40 of piston 10, cross sections through the piston 10 transverse to the cylinder 12's axis are ovals, the long dimension, or major axis 42, of each of which extends generally perpendicular to the axis 20 of the wrist pin 22. Generally, the lengths of major axes 42 are greater than the lengths of major axes 30. The ovals in the skirt 40 region illustratively are symmetrical about the wrist pin axis 20, with the piston 10's thrust and counterthrust faces 46, 48 coming substantially more closely into contact with the cylinder 12 wall toward the middle 49 of the length of the skirt 40. This configuration results in reduced slap during the high side thrust periods around bottom dead center and top dead center of the piston 10's travel. Illustratively, the major axes 42 of the skirt 40's ovals increase from the skirt 40's junction with the intermediate region 32 to the middle 49 of the skirt 40's length and then decrease uniformly from the middle 49 of the skirt 40 toward its remote end 50. This makes the skirt 40 somewhat barrel shaped in longitudinal section but oval, as previously described, in cross section.

I claim:

1. A piston for connection by a piston pin and connecting rod to a crankshaft for reciprocating in a cylinder of a four-cycle internal combustion engine, the piston having a crown and top land region, an intermediate region including at least one additional land, cross sections through the crown and top land region transverse to the cylinder axis being substantially uniform ovals, major axes of each of the ovals being generally parallel to a longitudinal axis of the piston pin, cross sections through the intermediate region being one of substantially circular and oval, major axes of each of the ovals of the intermediate region being generally transverse to the longitudinal axis of the piston pin.

2. The piston of claim 1 wherein the cross sections through the crown and top land region are uniform ovals.

3. The piston of claim 1 or 2 wherein longest dimensions of cross sections through the intermediate region are all substantially the same.

4. The piston of claim 3 wherein longest dimensions of the cross sections through the intermediate region are less than lengths of minor axes of the ovals of the crown and top land region cross sections.

5. The piston of claim 4 and further comprising a skirt region, the intermediate region located between the crown and top land region and the skirt region, cross sections through the skirt region transverse to the cylinder axis being ovals with major axes of the ovals being generally perpendicular to the longitudinal axis of the piston pin.

6. The piston of claim 5 wherein lengths of the major axes of the cross sections through the skirt region increase uniformly from a junction of the skirt region with the intermediate region to about mid-length of the skirt region and then decrease from about mid-length of the skirt region to a remote end of the skirt region.

7. The piston of claim 3 and further comprising a skirt region, the intermediate region located between the crown and top land region and the skirt region, cross sections through the skirt region transverse to the cylinder axis being ovals with major axes of the ovals being generally perpendicular to the longitudinal axis of the piston pin.

8. The piston of claim 7 wherein lengths of the major axes of the cross sections through the skirt region increase uniformly from a junction of the skirt region with the intermediate region to about mid-length of the skirt region and then decrease from about mid-length of the skirt region to a remote end of the skirt region.

9. The piston of claim 1 or 2 wherein longest dimensions of cross sections through the intermediate region are all less than lengths of minor axes of the ovals of the crown and top land region cross sections.

10. The piston of claim 9 and further comprising a skirt region, the intermediate region located between the crown and top land region and the skirt region, cross sections through the skirt region transverse to the cylinder axis being ovals with major axes of the ovals being generally perpendicular to the longitudinal axis of the piston pin.

11. The piston of claim 10 wherein lengths of the major axes of the cross sections through the skirt region increase uniformly from a junction of the skirt region with the intermediate region to about mid-length of the skirt region and then decrease from about mid-length of the skirt region to a remote end of the skirt region.

12. The piston of claim 1 or 2 and further comprising a skirt region, the intermediate region located between the crown and top land region and the skirt region, cross sections through the skirt region transverse to the cylinder axis being ovals with major axes of the ovals being generally perpendicular to the longitudinal axis of the piston pin.

13. The piston of claim 12 wherein lengths of the major axes of the cross sections through the skirt region increase uniformly from a junction of the skirt region with the intermediate region to about mid-length of the skirt region and then decrease from about mid-length of the skirt region to a remote end of the skirt region.

* * * * *